United States Patent [19]

Poynter

[11] Patent Number: 5,356,052
[45] Date of Patent: Oct. 18, 1994

[54] BFS METERED DROP BOTTLE

[75] Inventor: Richard Q. Poynter, Palm Beach Gardens, Fla.

[73] Assignee: HealthStar Inc., Quincy, Mass.

[21] Appl. No.: 135,798

[22] Filed: Oct. 13, 1993

[51] Int. Cl.$^5$ ............................................. B65D 47/18
[52] U.S. Cl. .................................... 222/420; 222/494
[58] Field of Search ............... 222/212, 213, 420, 421, 222/422, 490, 491, 494

[56] References Cited

U.S. PATENT DOCUMENTS

| | | | |
|---|---|---|---|
| 1,738,080 | 12/1929 | Smith | 222/490 |
| 3,184,121 | 5/1965 | Volckening | 222/213 |
| 3,773,233 | 11/1973 | Souza | 222/490 |
| 4,408,699 | 10/1983 | Stock | 222/420 X |
| 4,553,686 | 11/1985 | Dougherty | 222/422 X |
| 4,563,104 | 1/1986 | Saint-Amand | 222/420 X |
| 4,773,551 | 9/1988 | Rizzardi | 222/420 X |
| 4,917,267 | 4/1990 | Laverdure | 222/494 X |
| 5,158,213 | 10/1992 | Lataix | 222/420 X |

Primary Examiner—Kevin P. Shaver
Attorney, Agent, or Firm—Samuels, Gauthier & Stevens

[57] ABSTRACT

A drop dispenser for accurate dispensing of drops of a predetermined size. The dispenser comprises a container joined to a tip by a neck. The liquid from the container is forced into a flat flow passage in the neck and discharged into a chamber in the tip where the liquid coalesces. The liquid is then dispensed through an aperture which controls the size of the drop dispensed. The size of the aperture is independent of the pressure applied to the bottle. The flat flow passage prevents the flow of liquid therethrough at such a rate such that the liquid could be dispensed as a stream and not at the desired drop size.

4 Claims, 2 Drawing Sheets

BFS METERED DROP BOTTLE

Field of the invention

The invention relates generally to blow-fill and seal bottles (BFS) and particularly to the one-step formation of a BFS bottle with a dropper tip which dropper tip can dispense reproducible droplets.

BACKGROUND AND BRIEF SUMMARY OF THE INVENTION

With conventional practice, plastic bottles are blow molded in operations involving generally the sequence of extruding a tubular plastic, e.g., polyethylene parison, placing the parison within and between separable sections of a cavitated mold which closes upon the parison and subsequently blow molding the parison into the shape of the final container. Subsequently, the BFS bottle is filled, sealed and optionally labelled.

The liquid in the bottle is dispensed either in the form of a stream or drops. Where the liquid is to be dispensed in drops, typically, the orifice is formed in a separate structure of a different material which structure is subsequently inserted into the dropper tip. An "insert mold", i.e. a pre-made dropper tip, can also be mechanically inserted into the bottle. This step occurs after blowing and filling but prior to sealing. This adds an additional step to the manufacturing process and additional costs.

With prior art drop dispensing devices, if there is a small orifice but too much pressure is applied, the bottle will dispense the liquid in a stream rather than as droplets.

It is an object of the invention to form a BFS bottle in one step with a dropper tip having an orifice for dispensing liquid in the form of a drop.

It is a further object of the invention to form the orifice in the dropper tip such that regardless of the pressure applied to the bottle, the liquid will only be dispensed as drops. A stream of discharged liquid will not be formed.

The present invention, in one aspect, embodies a method of forming in a single step a BFS bottle having an orifice in the dropper tip.

The invention, in an other aspect, embodies the mold used in the method.

In a preferred embodiment, the cavitated mold halves are characterized by inserts which form a neck in the dropper bottle. The neck has walls which define a thin film flow path or orifice for the liquid in the bottle.

The invention, in still another aspect, embodies the bottle formed with the orifice in the dispensing

DESCRIPTION OF THE PREFERRED EMBODIMENT(S)

Figure 1:
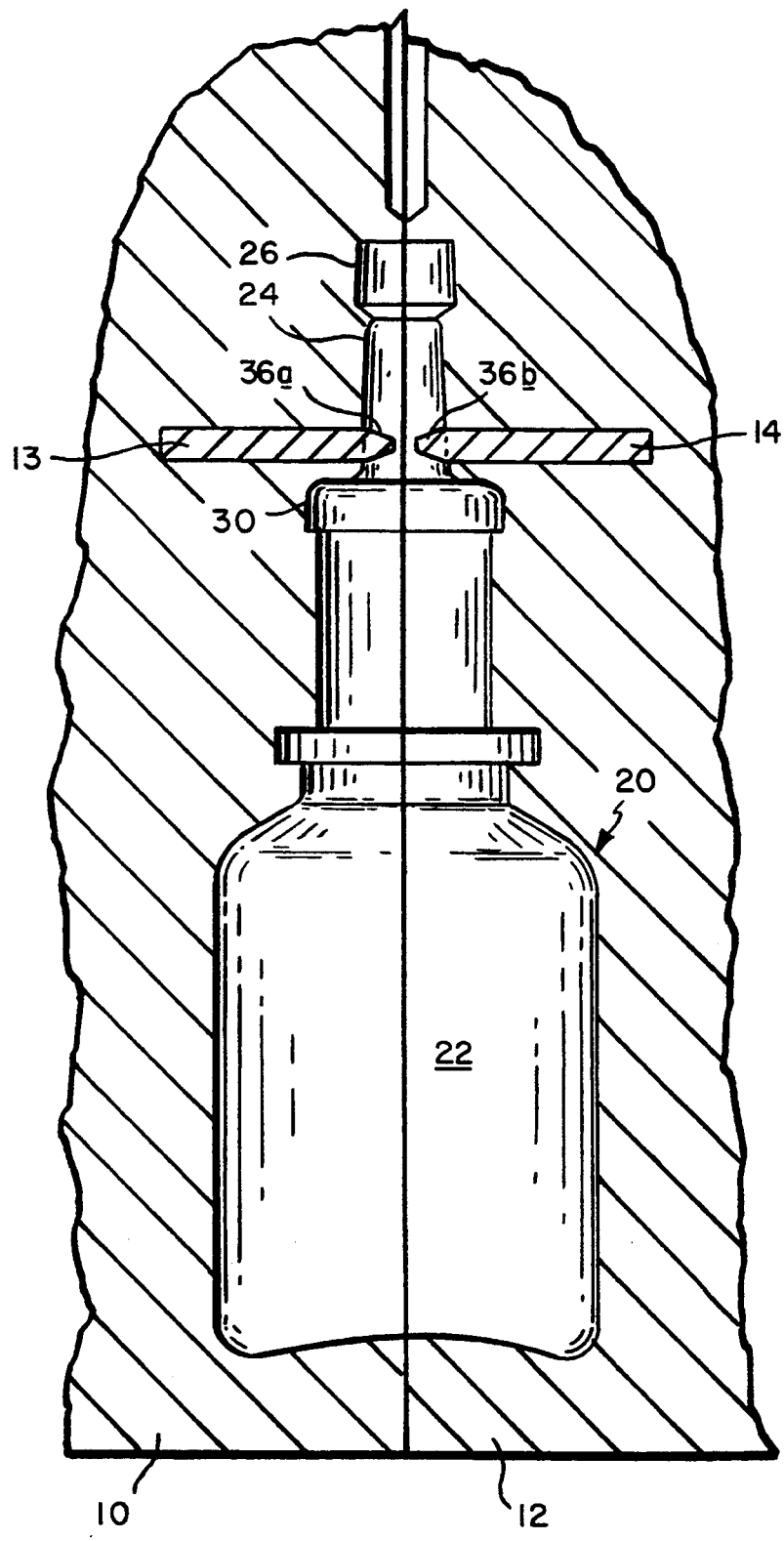
FIG. 1 is a front view of a bottle embodying the invention with a schematic illustration of a mold.

Referring to FIG. 1, two cavitated mold halves 10 and 12 are shown in their closed position. These mold halves are prior art and therefore are not shown in detail. These mold halves are modified according to one aspect of the present invention by the inclusion of inserts 13 and 14 which are welded or otherwise secured to the inner surface of the cavitated halves 10 and 12.

Also shown in FIG. 1 is a bottle 20 embodying the present invention which comprises a container 22 and a dropper tip 24 sealed by a twist off cap 26. The dropper tip includes an aperture 28, see FIG. 4.

Formed in the base of the dropper tip is a neck 30. The neck 30 is defined by two recessed walls 32a and 32b (with reference to the outer surface of the dropper tip) which walls are formed in abutting relationship to define an orifice 34. The neck also comprises a pair of support walls 36a and 36b.

Figure 2:
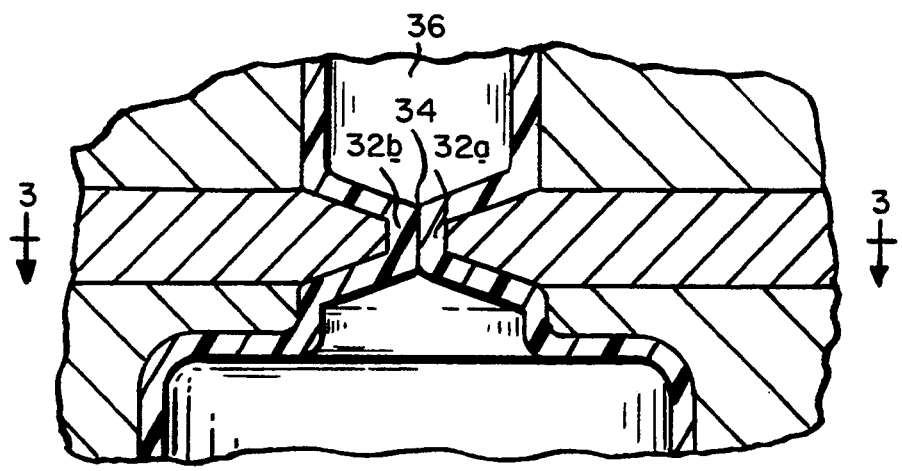
FIG. 2 is a sectional view of the neck formed in the bottle of FIG. 1.
Figure 3:
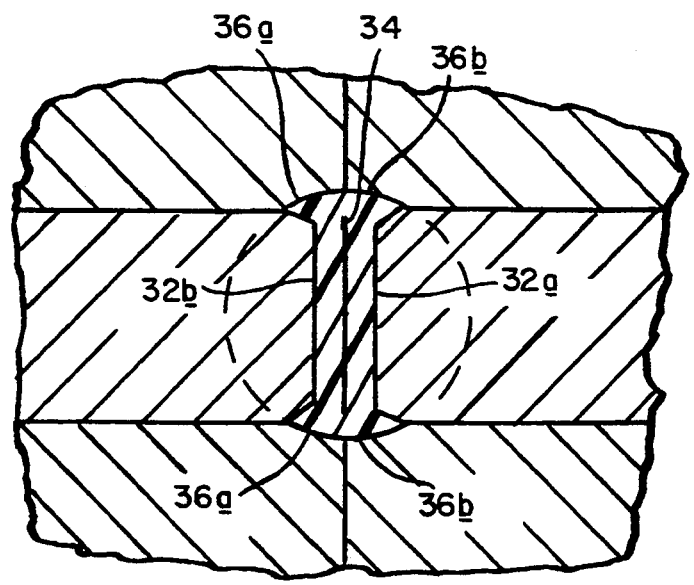
FIG. 3 is a sectional view of FIG. 2 taken along lines 3—3.

The bottle 20 is formed in the usual way, e.g. a polyethylene parison is formed, the mold halves 12 and 14 are closed and the bottle 30 formed. However, the inserts 13 and 14 are sized and spaced such that the neck 30 is also formed in the same bottle-forming step. By reducing the compression (amount of squeeze on molded resin in restricted area in the neck) the hot resin is not bonded together. This neck 30 is shown in greater detail in FIGS. 2 and 3. The inserts form the two recessed walls 32a and 32b and the support walls 36a and 36b. In the preferred embodiment, the inner surfaces of the walls 32a and 32b abut one another to define a planar flow path through the orifice 36.

In the use of the bottle embodying the invention, when pressure is applied to the walls of the container 22, the pressure forces the walls 32a and 32b apart. The liquid in the container flows through the planar flow path of the orifice 34 in thin film form.

Figure 4:
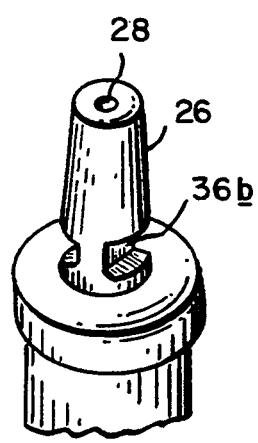
FIG. 4 is a perspective view of the dispensing tip of the invention.

The liquid flows through the flow path and into the dispensing tip chamber 36 where it coalesces and is discharged from the aperture 28, see FIG. 4, as a drop. The configuration of the walls 32a and 32b, namely defining the planar flow passage, prevents the liquid from being dispensed in the form of a liquid stream. Regardless of the pressure applied to the container 22 during normal use, the velocity of the liquid flowing through the neck will never be high enough to result in the liquid issuing from the dropper tip other than as a drop.

Once the desired drop size is known, the diameter of the aperture 28 is determined with reference to the surface tension of the liquid being dispersed and the composition of the dropper tip, e.g. polyurethane. In a preferred embodiment, to dispense aqueous droplets of 0.02/0.03 cc, the typical dimensions of the flow path would be 0.25 inches in length, having a cross sectional area of approximately 0.0093 square inches, the volume of the downstream dropper tip chamber would be 0.03/0.04 cc, the aperture size of 0.093 inches and the tip diameter, d, would be 0.12 inches.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A BFS metered drop bottle which comprises:
   a container;

a dispensing tip characterized by a chamber which terminals is an aperture which aperture determines the size of a dispensed drop; and a neck which joins the container to the tip to allow for the flow of a liquid from the container into the tip, the neck comprising two opposed flat abutting walls which define a substantially planar flow path between the container and the tip such that the liquid flows through the flow path in thin film form and coalesces in the tip chamber and is dispensed through the aperture as a drop of predetermined size.

2. The container of claim 1 wherein the walls are in contacting engagement when no pressure is applied to the container.

3. The container of claim 2 wherein the walls are formed such that when pressure is applied to the container the walls are forced apart to allow for the thin film flow of the liquid therebetween.

4. The container of claim 1 wherein the neck comprises support walls adjacent to the recessed walls.

* * * * *